Dec. 26, 1967  KARL-HEINZ RÜCKERT  3,360,122
DUAL-PURPOSE CONTAINER

Filed June 3, 1966  2 Sheets-Sheet 2

INVENTOR.
Karl-Heinz Rückert,
BY Wenderoth, Lind and
Ponack, Attorneys

United States Patent Office 3,360,122
Patented Dec. 26, 1967

3,360,122
DUAL-PURPOSE CONTAINER
Karl-Heinz Rückert, Tessin, Switzerland, assignor to Pharmaton S.A., Tessin, Switzerland
Filed June 3, 1966, Ser. No. 555,167
Claims priority, application Switzerland, June 4, 1965, 7,918/65
7 Claims. (Cl. 206—63.5)

ABSTRACT OF THE DISCLOSURE

A dual-purpose container for medical use having a lower member with a bottom and four side walls for holding an expendable medical material. A cover is removably mounted on such member and a separate part is provided for insertion into and for removal from such lower member. A separate part is provided for being inserted and removed from the lower member which will overlie the expendable material therein. The separate part is provided with a pervious portion forming a horizontal support area which will remain in spaced relationship from the body of the lower member when the expendable material is removed therefrom. The support area is designed to receive small medical tools and instruments so that they may be maintained in a cleaning or disinfecting agent when the lower member serves as a storage container for such agent.

---

The present invention relates to a container for expendable medical materials and which container can be employed for another use once it is empty.

The requirements demanded of a container for medical materials are quite different from those expected from a container for holding non-medical materials. Containers for medical materials must preserve the contents against breakage and contamination, yet be small, easily handled, and strong. In consequence of these requirements, the containers are made of high quality materials that last much longer than is necessary for a container. Moreover, the containers being intended to be discarded when empty, the excellent properties of the materials chosen are utilized but little or not at all.

Figure 1:
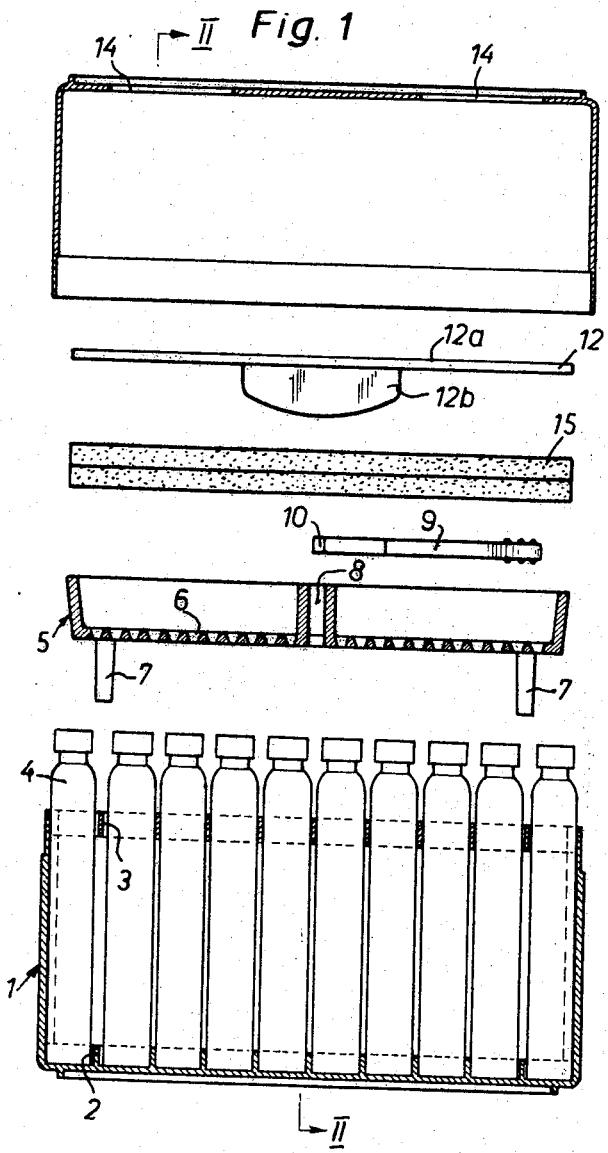
Figure 2:
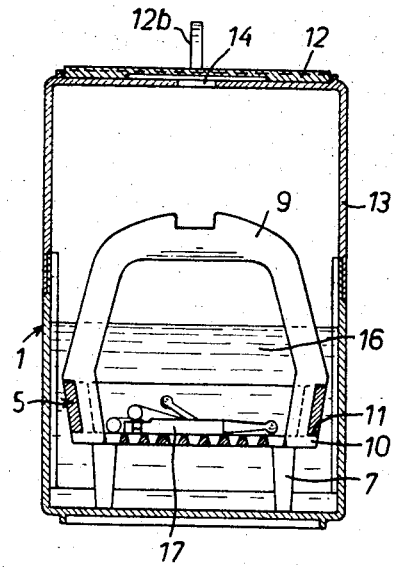

One embodiment of the invention will now be described in detail, with reference to the accompanying drawings, wherein:

FIG. 1 is an exploded view in cross section of the dual-purpose container as used for its first purpose; and FIG. 2 is a view along line II—II of FIG. 1 of the container in its second mode of employment.

Referring to FIGS. 1 and 2, the container has a box-like lower member 1 having a bottom divided into sections by stub walls 2. The vessels 4, shown as ampoules, are supported by a grid 3 aligned with the walls 2 and removably held at its ends by a press fit in the vertical walls of the container 1. A basket 5, for placement in the container 1, has a sieve-like bottom 6 and four feet 7. A groove 8 in each of the longitudinal walls of the basket receives a U-shaped, elastic handle 9 of which the ends have feet 10 that project into an opening 11 at the base of each groove, thereby releasably attaching the handle 9 to the basket 5.

A plate 12 having a grip 12b cooperates with a cover 13 for the member 1. The top of cover 13 has longitudinal openings 14 to be explained in connection with FIG. 2.

As apparent from the exploded view of FIG. 1, the container is assembled as a unit. The basket 5 is placed on the ampoules 4, the feet 7 engaging the ampoules of two adjacent rows and the bottom 6 coming to rest on the ampoule tops. The handle 9 is disconnected and laid in the basket 5. In order to hold in place the contents of the container, including the basket, elastic padding, such as a piece of foam material 15, is advantageously placed on top of the basket. The plate 12, in the position shown, is set on top of the foam 15, the grip 12b being pressed into the foam when the cover 13 is in place. The cover walls engage the side walls of the member 1 and are secured thereto by any suitable means, such as adhesive tape. With the cover 13 on, the surface 12a seals the openings 14, because the elastic foam lightly presses the plate 12 against the cover top.

As soon as the container in FIG. 1 is opened, the cover 13, member 12, and basket 5 with handle 9 are set to one side for use later; and the ampoules are exposed. When the supply of ampoules is exhausted, the grid 3 is removed; and the empty container, in conjunction with the parts set to one side, is ready for another purpose, FIG. 2.

The basket 5 with connected handle 9 is placed in the member 1 of the container, the feet 7 maintaining a separation between the basket bottom 6 and the bottom of member 1. The member 1 is filled with a sufficient quantity of liquid 16 to leave only the top portion of the handle 9 exposed. The cover 13 is set in place, the plate 12 being placed on the top thereof with grip 12b upright, whereby the openings 14 are closed preventing contamination and evaporation of the liquid.

In the particular embodiment illustrated, the liquid 16 is a disinfectant for cleaning and disinfecting dental drills, which are laid on the sieve-like bottom 6 of the basket 5. The matter on the drills dissolves and falls to the bottom of member 1. In order to ensure that most of the dissolved matter passes through the openings in bottom 6, in cross section the bars of the grid taper upwards and are rounded at the top, to present the smallest possible surface for catching falling matter.

The container as used in FIG. 2 can be located in the work area close at hand. Additional drills are added by removing plate 12. The drills, which are pushed over the edge of opening 14, automatically fall into the basket 5. When the drills are cleaned and disinfected, the cover 13 is taken off and the basket with the drills 17 removed by means of its handle 9.

Obviously, small medical tools and instruments other than drills can be cleaned and disinfected in the same way.

The container, in its form of FIG. 2, instead of being used to clean and disinfect, can be employed as a storage or protective case for small instruments previously disinfected in another way, and which are removed by means of the basket immediately before use.

In the form shown, the feet 7 can be omitted and shoulders extending from the side walls of member 1 provided for supporting the basket 5.

What I claim is:

1. Dual-purpose container for medical use, comprising in combination a lower member having a bottom and four sidewalls for holding an expendable medical material, a cover removably mounted on said lower member, a separate part for insertion in and for removal from said lower member, said part overlying said expendable material beneath said cover when said container is filled with said expendable material and said cover is placed on said lower member, said part having a pervious portion defining a substantially horizontal support area removably positionable in spaced relationship from said bottom of said lower member when the latter is emptied of said expendable material, said support area when placed in spaced relationship from said bottom being adapted to receive small medical tools and instruments thereon for keeping same retractably immersed in a cleaning and/or disinfecting agent, said emptied lower member serving as a storage container for said agent.

2. The dual-purpose container according to claim 1, wherein said cover has openings through which the small medical tools and instruments enter the closed container with said part inserted therein.

3. The dual-purpose container according to claim 2, including a plate that covers said openings from within the container when the latter is full and from outside the container when the latter is empty.

4. The dual-purpose container according to claim 3, wherein said part is a basket and including a detachable handle for the basket.

5. The dual-purpose container according to claim 4, including feet that rest on said bottom and support said surface in spaced relation to said bottom.

6. The dual-purpose container according to claim 4, wherein shoulders are provided on the inside surfaces of said side walls for supporting said horizontal surface.

7. The dual-purpose container according to claim 1, wherein said horizontal support area is formed by bars which in transverse cross section taper upwards.

References Cited
UNITED STATES PATENTS

| | | | |
|---|---|---|---|
| 799,166 | 9/1905 | Johnson | 206—63.3 |
| 1,382,715 | 6/1921 | Davis | 206—63.3 |
| 2,798,601 | 7/1957 | Haas | 206—63.3 |
| 2,935,206 | 5/1960 | Smith | 206—72 X |

THERON E. CONDON, *Primary Examiner.*
LOUIS G. MANCENE, *Examiner.*